Sept. 28, 1926.                      1,601,438
G. A. GUSTAFSON
FRICTION SAFETY DRIVE
Filed March 20, 1924      2 Sheets-Sheet 1

Witnesses:

Inventor:
Gustaf A. Gustafson

Sept. 28, 1926.  G. A. GUSTAFSON  1,601,438
FRICTION SAFETY DRIVE
Filed March 20, 1924   2 Sheets-Sheet 2

Patented Sept. 28, 1926.

UNITED STATES PATENT OFFICE.

GUSTAF A. GUSTAFSON, OF CHICAGO, ILLINOIS.

FRICTION SAFETY DRIVE.

Application filed March 20, 1924. Serial No. 700,479.

My invention relates to improvements in friction safety drives especially adapted to prevent injury to various forms of machinery in case of accident or other misuse thereof, the object of the invention being to provide a simple and effective device of this character capable of economical manufacture and highly efficient in use.

Other objects will appear hereinafter.

The invention consists in the combinations and arrangements of parts hereinafter described and claimed.

Figure 1:
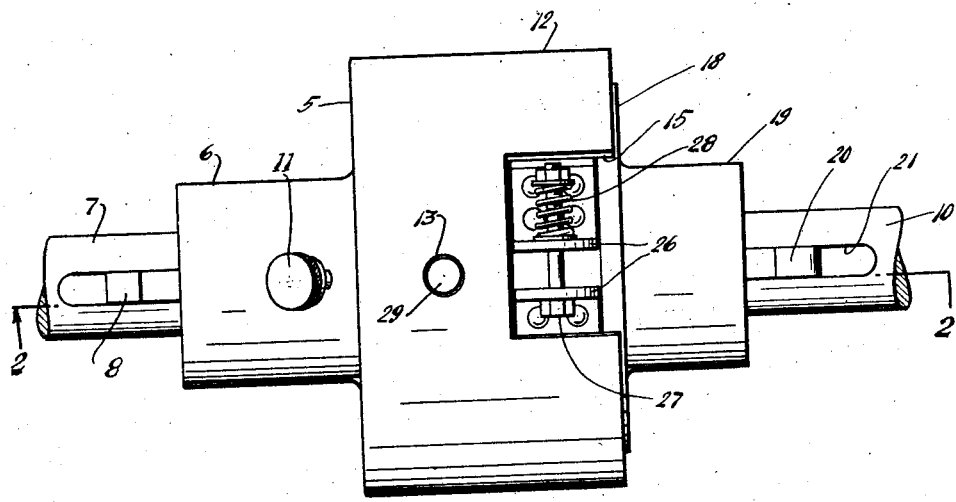
Figure 2:
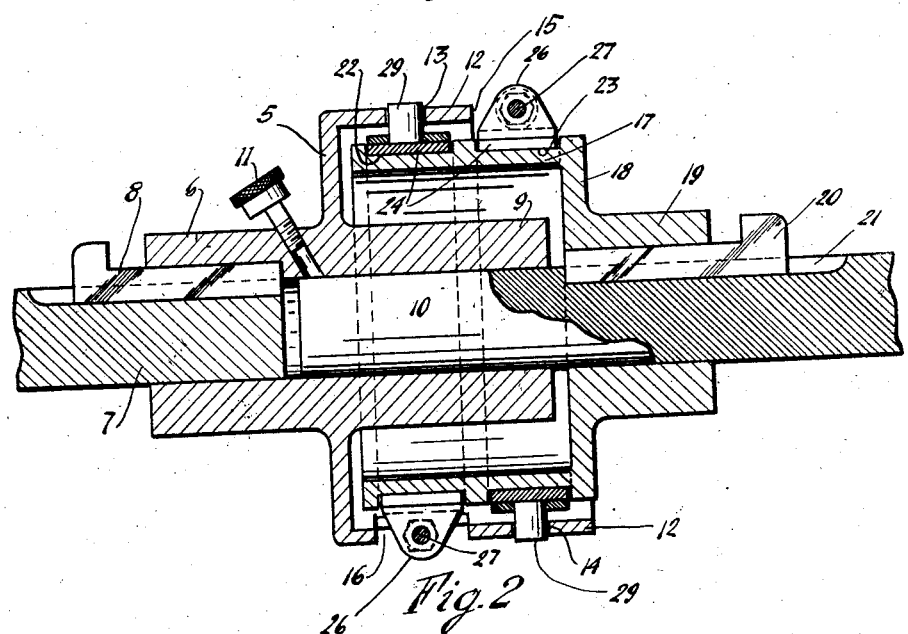
Figure 3:
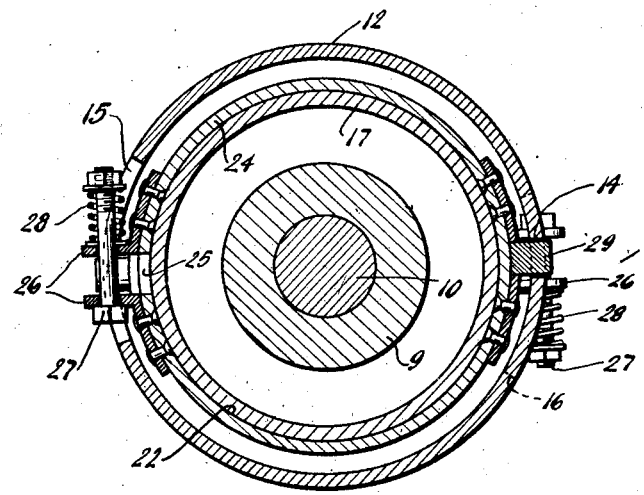

The invention will be best understood by reference to the accompanying drawings forming a part of this specification, and in which, Fig. 1 is a side view of a device embodying the invention shown as mounted on a drive shaft;

Fig. 2 a section taken on line 2—2 of Fig. 1;

Fig. 3 a transverse section of the same; and

Figure 4:
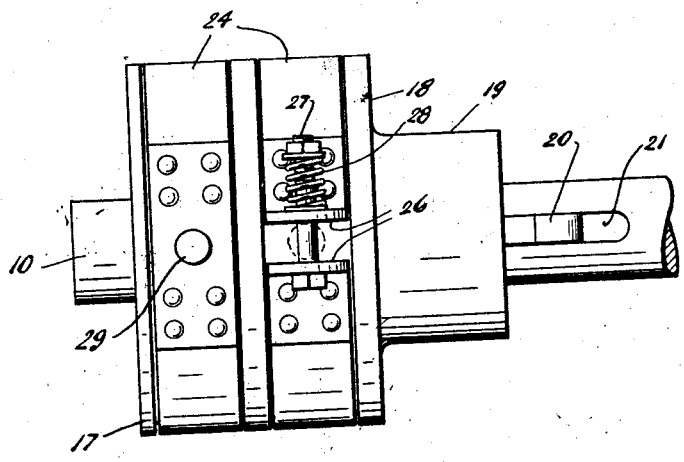

Fig. 4 a view similar to Fig. 1 but showing the outer enclosing member removed.

The preferred form of construction as illustrated in the drawings comprises an outer enclosing casing 5 having a hub 6 to receive the end 7 of a drive shaft section to which it is secured by a key 8. The casing 5 is also provided with a bearing 9 coaxial with the hub 6 and adapted to receive the end 10 of the adjoining section of the drive shaft, a grease cup 11 being provided to lubricate the bearing 9 and whereby the drive shaft sections may rotate independently of each other but in axial alinement.

The casing 5 is provided with an encompassing annular flange 12 having two diagonally opposite circular openings or notches 13 and 14 therein and also two diagonally opposite rectangular openings or notches 15 and 16, the notch 15 being diametrically opposite the notch 14 and the notch 16 being diametrically opposite the notch 13. The flange 12 is of a size to loosely enclose a corresponding flange 17 on another casing 18 having a hub 19 secured to the other shaft section 10 by means of a key 20 engaging a groove 21 as shown. The flange 17 is provided with peripheral grooves or recesses 22 and 23 adapted and arranged to receive split friction bands 24 as shown. These friction bands are provided at their gaps 25 with outwardly extending perforated lugs 26 and adjusting bolts 27 are extended there through, compression springs 28 being imprisioned on said bolts. Each friction band 24 also carries an anchoring projection 29 arranged diametrically opposite its gap, the projections 29 being fitted into the opposite notches 13 and 14 in the flange 12 as shown, the lugs 26 projecting through the notches 15 and 16. In assembling the parts the friction bands are first placed in position within the flange 12 and the flange 17 on the casing 18 mounted in place within said bands then the adjusting nuts 27 are tightened until the friction bands 24 engage the bottoms of the grooves 22 and 23 and whereby a frictional driving engagement is effected between the adjacent drive shaft sections 7 and 10. Obviously this frictional engagement may be readily adjusted by means of the bolts 27 if desired.

By this arrangement the device may be readily attached to the drive shaft of any machinery or apparatus as indicated, and will function to permit the normal operation of the drive shaft. If however undue strain is thrown upon the shaft the frictional engagement between the bands 24 and the grooves 23 will yield and thus prevent injury to the machinery. Thus in case of accident or misuse of the machinery the driving force will be automatically discontinued before any of the parts of the machine are broken or injured thereby. It will also be observed that the arrangement is such as to impart a double balanced torque to the drive shaft thus avoiding undue strains thereon or tendency to bend the same. The specific form and arrangement of parts is a simple and efficient one for the purpose and capable of economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a device of the class described, the combination with two adjoining separate axial shaft sections; driving members secured to said shaft sections and having circumferential flanges projecting one within the other; one of said flanges having keeper openings therein; two separate sets of yielding friction bands between said flanges; and means on said friction bands engaging said keeper openings, substantially as described.

2. A device of the class described comprising two adjoining members, one of said members having a hub provided with a bore to receive and be secured to the end of a shaft section and a bearing coaxial with said bore to receive the end of a separate shaft section, the other of said members being provided with a hub coaxial with the hub and bearing on the other member to receive and be secured to said other shaft section; two adjacent friction band grooves formed in the periphery of one of said members; oppositely disposed split friction bands secured in said grooves, the ends of said bands at the gaps therein being provided with outwardly extending perforated lugs, spring bolts extending through said perforations, and anchoring projections on said bands diametrically opposite said lugs, the other of said members being provided with a flange enclosing said friction bands and notched to receive said lugs and anchoring projections, substantially as described.

3. In a device of the class described; the combination with two adjoining coaxial separate shaft sections; of driving members secured to said sections and having flanges arranged one within the other; and two friction bands positively secured to the flange of one member at diametrically opposite points and frictionally engaging the flange of the other of said members, substantially as described.

In testimony whereof I have signed my name to this specification.

GUSTAF A. GUSTAFSON.